March 22, 1966  G. E. BURBANK  3,242,426
MAGNETIC TESTING PROBE WITH MUTUALLY PERPENDICULAR ENERGIZING
AND PICKUP COILS, THE LATTER SURROUNDING THE FORMER
Filed Oct. 2, 1961
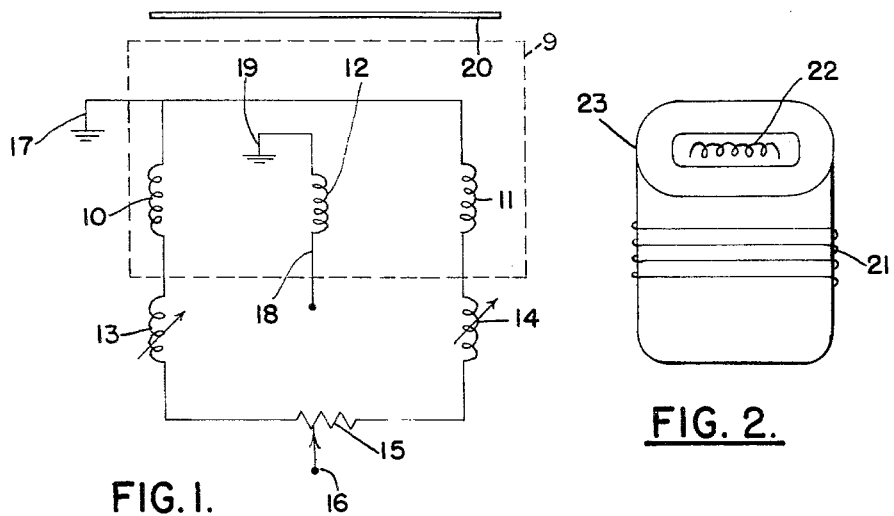
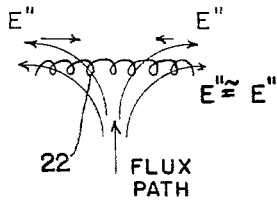
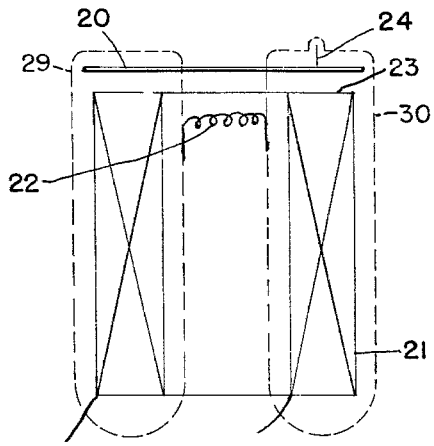
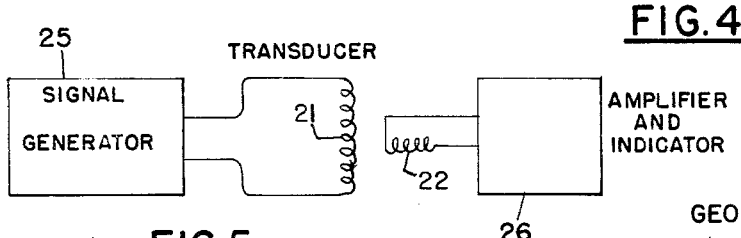
*INVENTOR.*
GEORGE E. BURBANK

United States Patent Office 3,242,426
Patented Mar. 22, 1966

3,242,426
MAGNETIC TESTING PROBE WITH MUTUALLY PERPENDICULAR ENERGIZING AND PICKUP COILS, THE LATTER SURROUNDING THE FORMER
George E. Burbank, 11 Woodbine Ave., Maple Shade, N.J.
Filed Oct. 2, 1961, Ser. No. 142,448
2 Claims. (Cl. 324—37)

The invention described herein may be manufactured and used by or for the Government for governmental purposes without the payment to me of any royalty thereon.

This invention relates to devices for detecting non-homogeneity in metals. Its purpose is to provide an improved device which is operable over a wide range of fixed or constantly varying frequencies, without the need for any balancing adjustments, to detect faults in a metal such as aluminum or steel.

Numerous fault detecting or inspecting devices are now available. These devices generally include a probe which requires means for keeping it in balance under different operating conditions. The present invention avoids this and other difficulties by the provision of a relatively simple probe wherein the magnetic fields of an energizing coil and a pickup coil are so related that current is produced in the pickup coil only when eddy currents induced in the tested metal by the probe and flux passing through the pickup coil from the energizing coil are distorted by a non-homogeneity in the metal. This mode of operation very considerably reduces the number of parts involved in the construction of the probe and effects a manufacturing cost saving of the order of fifty percent.

The invention will be better understood from the following description when considered in connection with the accompanying drawings and its scope is indicated by the appended claims.

Referring to the drawings:

FIG. 1 is a wiring diagram of a probe including related balancing devices in general use prior to the present invention, FIG. 2 is a perspective end view of a probe element of the present invention indicating the physical relation between an operating end and certain energizing and pickup coils thereof, FIG. 3 is an explanatory diagram indicating the balanced relation between voltages induced in the pickup coil in the absence of a test piece or in the presence of a test piece which is homogeneous, FIG. 4 is a diagrammatic plan view of the device of FIG. 2 indicating how voltages induced in the pickup coil are unbalanced when the probe is adjacent a non-homogeneous test piece, and FIG. 5 is a block diagram showing a complete system including the test device of the present invention.

FIG. 1 illustrates a well known type of probe, outlined at 9, which is utilized to detect non-homogeneity in metals. This probe includes energizing coils 10 and 11 and a pickup coil 12, the axes of these coils being parallel with one another. For balancing the voltages induced in the pickup coil by the energizing coils, there are provided a pair of adjustable inductors 13 and 14 and an adjustable resistor 15. In the use of this probe a source of energizing current (not shown) is connected between the lead 16 and ground 17, and the leads 18 and 19 of the pickup coil are likewise connected to indicator means, as is understood.

With the currents of the energizing coils 10 and 11 adjusted to values such that they induce equal and opposite voltages in the pickup coil 12, the resultant current of this coil is zero. Under these conditions, a test piece 20 adjacent to the probe has induced in it eddy currents which react on the pickup coil to unbalance its opposed voltages only when the test piece is non-homogeneous and the path of the eddy currents is distorted. While this prior art probe is effective to detect faults in the test piece, it has the disadvantage that (1) it involves a multiplicity of parts, and (2) it has to be rebalanced with every change in frequency. The present invention avoids these difficulties by the provision of an improved probe which involves the use of only two coils and is operable without rebalancing over a wide range of frequencies. As will hereinafter appear, this result is achieved by so positioning the coils with respect to one another that the voltages induced in the pickup coil are permanently balanced in the absence of distorted eddy currents.

Thus as seen in FIG. 2, the probe of the present invention includes an energizing coil 21 and a pickup coil 22, the magnetic axes of these two coils being perpendicular to one another and the coil 22 being at one end of the coil 21 or probe, in the flux paths between the coil 21 and the test sample or piece. This fixes the relation between the coils so that the voltages induced in the ends of the pickup coil 22 are normally opposite and equal as indicated by FIG. 3. In the use of this probe, its operating or coil end 23 (FIG. 2) is placed against the test piece. As a result, eddy currents due to flux 29–30 from the coil 21 are induced in the test piece, these eddy currents having no effect on the balance of the induced voltages of the pickup coil 22 so long as the test piece is homogeneous. The flux paths from the energizing coil through the pickup coil, and the induced voltages, however, are unbalanced, as indicated by FIG. 4, when the test piece 20 is brought up against the probe or coil end 23 and has a fault 24. A differential voltage output is provided by the pickup coil 22 and is used in connection with the complete system shown in FIG. 5 for indication thereof.

As indicated by FIG. 5, there is associated with the probe 21–22, a signal generator 25 and an amplifier and indicator 26. The generator 25 is connected to the energizing coil 21 and may operate at frequencies of 20 kc. to 200 kc. The amplifier is connected to the pickup coil 22, and it and the indicator may be of any suitable types which are operable at the test frequencies utilized.

The device of FIG. 5 is operable over a frequency range of 20 kc. to 200 kc. to detect flaws in steel and aluminum to a depth of 0.010 to 0.100 inch. This is accomplished without balancing adjustments of any kind by a device which involves relatively few parts and is manufactured at a cost about half that of the prior art device illustrated by FIG. 1.

I claim:

1. In a device for detecting non-homogeneity in metals the combination of:
    an elongated probe element having a central longitudinal axis terminating in an outer probe end thereof,
    said element including energizing and pickup coils positioned along said axis with the pickup coil in one end of said energizing coil and at a right angle to said axis,
    said energizing coil further being in coaxial alignment with and surrounding said probe element and said pickup coil being located at the outer end thereof,
    said pickup coil thereby being in the center of the magnetic field and flux path of said energizing coil to receive maximum excitation therefrom in response to signal current applied thereto, means connected with said energizing coil for applying signal current to said coil to establish a uniform magnetic field in said flux path and through said coil and probe end, and means connected with said pickup coil for detecting signal currents induced in said coil by the presence of metal at said outer end of the probe element and resultant distortion in the magnetic field of said energizing coil and flux through said pickup coil due to non-homogeneity in said metal.

2. In a device for detecting faults in metallic and like structural elements comprising electrically-conductive materials, the combination of:

an elongated probe element having a central longitudinal axis and an outer probe end normal thereto for contacting said structural elements in testing, energizing and signal pickup coils positioned along said axis with said pickup coil at a right angle thereto adjacent said probe end and said energizing coil coaxial therewith and extending to said end to surround said pickup coil and closely inductively couple therewith for maximum excitation thereof in response to signal current applied to said energizing coil, means connected with said energizing coil for applying signal current thereto in a low frequency band just above the audible range to provide along said axis a magnetic field and flux path through said pickup coil and probe end in contact with a structural element to be tested, and means connected with said pickup coil for detecting signal currents induced in said coil by the presence of metal at said outer end of the probe element and resultant distortion in the magnetic field of said energizing coil and flux through said pickup coil due to non-homogeneity in said metal.

References Cited by the Examiner

UNITED STATES PATENTS

| | | | |
|---|---|---|---|
| 1,910,820 | 5/1933 | Blinn | 324—41 |
| 2,065,118 | 12/1936 | Davis | 324—40 |
| 2,489,920 | 11/1949 | Michel | 324—40 |
| 2,511,233 | 6/1950 | Anderson | 324—37 |
| 2,790,140 | 4/1957 | Bender | 324—37 |
| 3,061,775 | 10/1962 | Reznowski | 324—41 |

OTHER REFERENCES

R. C. McMaster, Nondestructive Testing Handbook, N.Y., Ronald Press, copyright 1959, vol. 2, pp. 37.9–37.10.

WALTER L. CARLSON, *Primary Examiner.*

FREDERICK M. STRADER, *Examiner.*

F. A. SEEMAR, R. J. CORCORAN, *Assistant Examiners.*